United States Patent
Kim et al.

(10) Patent No.: US 9,125,070 B2
(45) Date of Patent: Sep. 1, 2015

(54) METHOD AND APPARATUS FOR GENERATING REFERENCE SIGNAL IN ANALOG/DIGITAL MIXED BF SYSTEM

(71) Applicant: Samsung Electronics Co., Ltd, Gyeonggi-do (KR)

(72) Inventors: Tae-Young Kim, Gyeonggi-do (KR); Shuangfeng Han, Gyeonggi-do (KR); Jeong-Ho Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 180 days.

(21) Appl. No.: 13/853,699

(22) Filed: Mar. 29, 2013

(65) Prior Publication Data

US 2013/0258972 A1    Oct. 3, 2013

(30) Foreign Application Priority Data

Mar. 29, 2012    (KR) ........................ 10-2012-0032339

(51) Int. Cl.
*H04W 4/00*     (2009.01)
*H04W 16/28*    (2009.01)
*H04B 7/06*     (2006.01)
*H01Q 3/00*     (2006.01)
*H04B 1/00*     (2006.01)

(52) U.S. Cl.
CPC ............. *H04W 16/28* (2013.01); *H04B 7/0617* (2013.01); *H04B 7/0634* (2013.01)

(58) Field of Classification Search
CPC .... H04W 16/28; H04B 7/0617; H04B 7/0634
See application file for complete search history.

(56) References Cited

U.S. PATENT DOCUMENTS

| | | | |
|---|---|---|---|
| 8,754,810 B2 * | 6/2014 | Guo et al. | 342/368 |
| 2006/0126753 A1 * | 6/2006 | Jwa et al. | 375/267 |
| 2009/0322613 A1 * | 12/2009 | Bala et al. | 342/373 |
| 2010/0061360 A1 * | 3/2010 | Chen et al. | 370/342 |
| 2010/0238824 A1 * | 9/2010 | Farajidana et al. | 370/252 |
| 2011/0109507 A1 * | 5/2011 | Warnick | 342/368 |
| 2011/0291891 A1 * | 12/2011 | Nsenga et al. | 342/373 |
| 2012/0034952 A1 * | 2/2012 | Lo et al. | 455/562.1 |
| 2013/0039401 A1 | 2/2013 | Han et al. | |
| 2013/0057432 A1 * | 3/2013 | Rajagopal et al. | 342/368 |
| 2013/0088381 A1 * | 4/2013 | Puzella et al. | 342/154 |

OTHER PUBLICATIONS

International Search Report dated Jul. 18, 2013 in connection with International Patent Application No. PCT/KR2013/002645.
Written Opinion of the International Searching Authority dated Jul. 18, 2013 in connection with International Patent Application No. PCT/KR2013/002645.

* cited by examiner

*Primary Examiner* — Clemence Han

(57) ABSTRACT

A millimeter radio wave communication system. In a method for operating a base station (BS) in an analog/digital mixed BF system, an analog BF direction is determined. A digital BF precoder is determined for the determined analog BF direction. Digital BF precoding is performed using the digital BF precoder with respect to the determined analog BF direction. A DownLink Reference Signal (DL RS) is transmitted in the analog BF direction on which the digital BF precoding has been performed.

20 Claims, 7 Drawing Sheets

METHOD AND APPARATUS FOR GENERATING REFERENCE SIGNAL IN ANALOG/DIGITAL MIXED BF SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Mar. 29, 2012 and assigned Serial No. 10-2012-0032339, the entire disclosure of which is hereby incorporated by reference.

TECHNICAL FIELD

The present disclosure relates to a millimeter radio wave communication system. More particularly, the present disclosure relates to a method and an apparatus for improving a beamforming (BF) gain in a millimeter radio wave communication system.

BACKGROUND

With respect to a wireless communication system, as a request for a bandwidth gradually increases, it has led a study and development for a millimeter radio wave communication system. However, a very high penetration loss and a very high absorption loss have been problematic and to solve this problem, a beamforming (BF) has been required. For this BF technique, there exist an analog BF (ABF) and a digital BF (DBF).

However, a technique of a mixed analog and digital BF has not been sufficiently studied.

SUMMARY

To address the above-discussed issues, it is a primary object to provide a method and an apparatus for generating a reference signal (RS) in an analog/digital mixed BF system.

Another aspect of the present disclosure is to provide a method and an apparatus for generating a codebook in an analog/digital mixed BF system.

Still another aspect of the present disclosure is to provide a method and an apparatus for generating a codebook maximizing a mixed analog/digital beamforming (BF) gain even in any predetermined direction with respect to a main analog/digital beam peripheral direction in an analog/digital mixed BF system.

Yet another aspect of the present disclosure is to provide a method and an apparatus for utilizing a codebook maximizing a mixed analog/digital beamforming (BF) gain even in any predetermined direction with respect to a main analog/digital beam peripheral direction in an analog/digital mixed BF system.

In accordance with an aspect of the present disclosure, a method for operating a base station (BS) in an analog/digital mixed beamforming (BF) system is provided. The method includes determining an analog BF direction, determining a digital BF precoder for the determined analog BF direction, performing digital BF precoding using the digital BF precoder with respect to the determined analog BF direction, and transmitting, a DownLink Reference Signal (DL RS) in the analog BF direction on which the digital BF precoding has been performed.

In accordance with another aspect of the present disclosure, a method for operating a mobile station (MS) in an analog/digital mixed beamforming (BF) system is provided. The method includes receiving a downlink reference signal (DL RS) transmitted by a base station (BS), selecting a best precoder from the DL RS, and feeding back information regarding the selected precoder to the BS.

In accordance with still another aspect of the present disclosure, an apparatus of a base station (BS) in an analog/digital mixed beamforming (BF) system is provided. The apparatus includes a controller for determining an analog BF direction, determining a digital BF precoder for the determined analog BF direction, performing digital BF precoding using the digital BF precoder on the determined analog BF direction, and generating a downlink reference signal (DL RS) directed to the analog BF direction on which the digital BF precoding has been performed, a transmitter for transmitting the DL RS, a plurality of antennas including a plurality of antenna elements, and a plurality of Radio Frequency (RF) chains connected to the antenna elements, forming a beam to the analog beam direction determined by the controller, and transmitting the DL RS.

The apparatus of the BS further includes a receiver configured to receive feedback from a mobile station (MS). In the apparatus of the BS, the feedback comprises at least one of best analog BF direction information and best digital BF subcarrier index selected by the MS. In the apparatus of the BS, in determining the digital BF precoder for the determined analog BF direction, the controller is configured to allocate a digital BF precoder on consecutive frequency resources in a frequency domain. In the apparatus of the BS, when a power boost is applied to the DL RS, the controller is configured to control the transmitter to send an indication to the MS that the power boost is applied.

In accordance with yet still another aspect of the present disclosure, an apparatus of a mobile station (MS) in an analog/digital mixed beamforming (BF) system is provided. The apparatus includes a receiver for receiving a downlink reference signal (DL RS) from a base station (BS), a transmitter for feeding back information regarding a selected precoder to the BS, a channel estimator for estimating a channel depending on a DL beam direction using the DL RS, and a controller for determining a best precoder from the DL RS with consideration of channel information depending on the DL beam direction.

In the apparatus of the MS, the receiver is configured to receive frequency allocation information from the BS. In the apparatus of the MS, the information regarding the selected precoder comprises information for a best subcarrier. In the apparatus of the MS, in selecting the precoder from the DL RS, the controller is configured to calculate average power for a plurality of subcarriers, and select a best subcarrier having a largest average power. In the apparatus of the MS, the information regarding the selected precoder comprises information of a best analog BF direction and information of a best digital BF subcarrier index selected by the MS.

Other aspects, advantages and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1A:
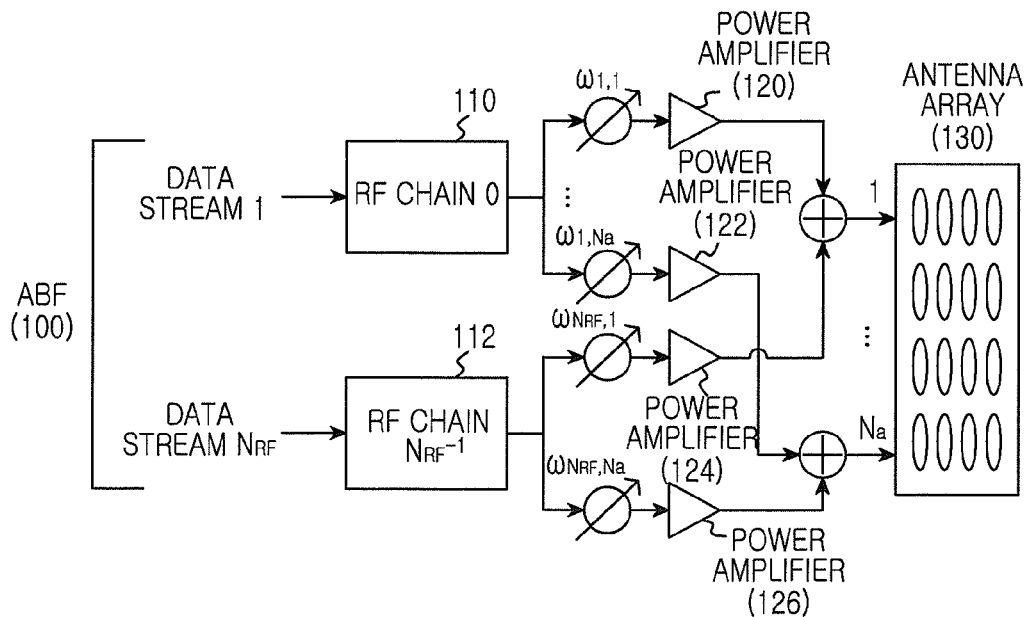
FIGS. 1A-B illustrate a BF structure according to an embodiment of the present disclosure.

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. Also, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure are provided for illustration purpose only and not for the purpose of limiting the disclosure as defined by the appended claims and their equivalents.

Exemplary embodiments of the present disclosure provide a method and an apparatus for generating a reference signal (RS) in an analog/digital mixed beamforming (BF) structure.

A BF technology is widely used in a millimeter wave (mmW) communication system. However, the BF technology requires beam training in order to raise a BF gain. The accuracy of analog beam training is limited due to difficulty at a Base Station (BS) in forming beam in directions with refined granularity.

The present disclosure proposes a new BF technique. The new BF technique utilizes an analog/digital BF structure, and allows a mobile station (MS) to search for and discover a best downlink (DL) beam direction. A BF codebook on an RF chain has been designed to utilize beam training. A BF codebook entry is designed for maximizing an analog/digital BF gain in a specific direction.

DBF allocates a BF weight on a digital baseband (multiple RF chains are required), and ABF allocates a BF weight on each antenna element on an analog baseband.

The present disclosure provides a method and an apparatus for utilizing a codebook maximizing a mixed analog/digital BF gain even in any predetermined direction with respect to a main analog/digital beam peripheral direction in an analog/digital mixed BF system.

The present disclosure proposes an analog/digital mixed BF structure and a method for utilizing a digital BF codebook. In the method, reference signal (RS) generation is proposed, and the RS allocates a digital BF entry on a neighbor subcarrier.

Therefore, beam training is performed on a frequency domain via feedback of an MS that feeds back a subcarrier index for a signal of a best form.

Figure 1B:
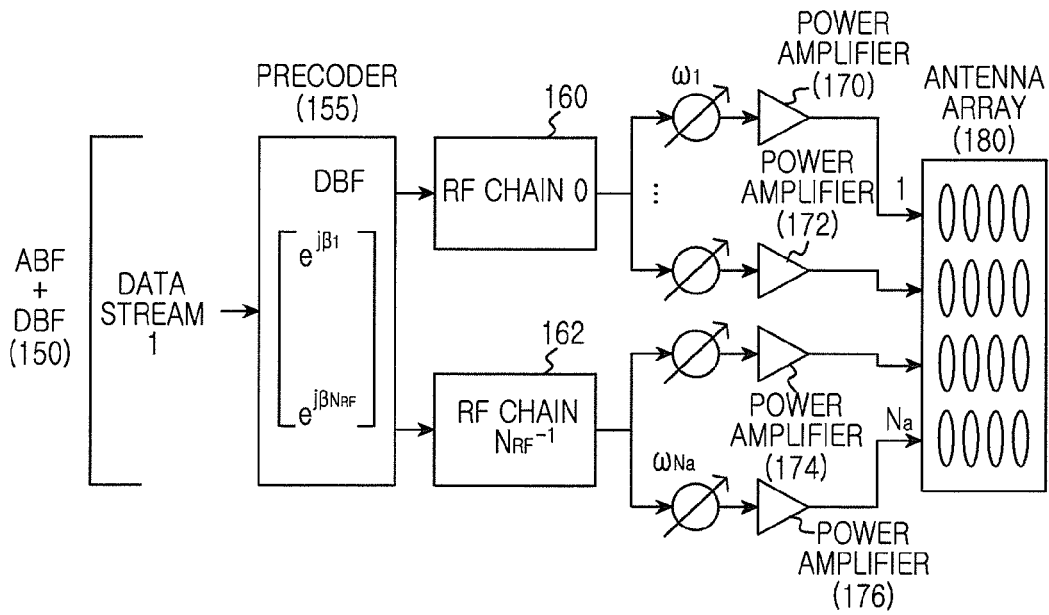

FIGS. 1A-B illustrate a BF structure according to an embodiment of the present disclosure.

Referring to FIGS. 1A-B, an analog BF structure 100 and an analog/digital BF structure 150 are disclosed.

Antenna arrays 130 and 180 exist in the analog, BF structure 100 and the analog/digital BF structure 150, respectively, and the number of the antenna arrays is $N_a$. In addition, respective RF chains 110, 112, 160, 162 exist, and the number of RF chains is $N_{RF}$. Beams are amplified by power amplifiers 120, 122, 124, 126, 170, 172, 174, and 176.

In the analog BF structure 100, analog BF is performed independently on data on each RF chain. Accordingly, $N_{RF}$ beams are simultaneously generated and point to different directions, respectively. To coordinate a main beam direction on RF chains of 0 to $N_{RF}-1$, we need $\omega_{1,j}=e^{-j2\pi d/\lambda_j \cos\theta_0}$ for $i=0, \ldots, 1=0, \ldots, N_a-1$ ($i$=RF chain index). Here, an analog BF gain becomes $$\sum_{i=0}^{N_a-1} e^{j2\pi d/\lambda_i(\cos\theta - \cos\theta_0)}$$

depending on directions.

In the analog/digital mixed BF structure 150, $N_a$ antenna elements are partitioned equally into $N_{RF}$ subsets, each connected with one RF chain. 1-stream data is multiplied by the digital BF precoder $$[e^{j\beta_0}, \ldots, e^{j\beta_{N_{RF}-1}}]$$

155, where $\beta_l (l=0, \ldots, N_{RF}-1)$ is the phase of on the lth RF chain.

Analog/digital BF is performed within each antenna subset with same beam direction $\theta_0$. Note that between the first and the lth antenna subset there exist phase shift $2\pi d/\lambda (N_a/N_f)(\cos \theta - \cos \theta_0)$. The combined BF gain in direction $\theta$ is derived to be $$\text{Gain}(\theta) = \sum_{l=0}^{N_{RF}-1} e^{j\beta_l} \sum_{i=0}^{N_a/N_{RF}-1} e^{j2\pi d/\lambda (i+lN_a/N_f)(\cos\theta-\cos\theta_0)} \quad (1)$$

$$= \left( \sum_{l=0}^{N_{RF}-1} e^{j\beta_l} e^{j2\pi d/\lambda (lN_a/N_{RF})(\cos\theta-\cos\theta_0)} \right) \times$$

$$\left( \sum_{i=0}^{N_a/N_{RF}-1} e^{j2\pi d/\lambda i(\cos\theta-\cos\theta_0)} \right)$$

$$= G_{DBF}(\theta) \times G_{SABF}(\theta)$$

Obviously, the digital BF precoder 155 does not have an influence on an analog BF gain. To maximize the above combined BF gain, the optimal $\beta_l$ should be determined to maximize $G_{DBF}(\theta)$. $\beta_l$ can be derived to be $$\beta_l^* = 2\pi \times d \times l/\lambda \times N_a/N_f \times (\cos \theta_0 - \cos \theta) \quad (2)$$

In a given antenna configuration, $d$, $N_a$, $N_{RF}$, $\beta_l$ depend on an analog BF direction $\theta_0$ and an angle of departure $\theta$.

Substituting $\beta_l$ into Equation (1), a combined BF gain is upper bounded by the maximal gain depending on direction as in Equation (3) below.

$$\text{Gain} \leq N_{RF} \times \sum_{i=0}^{N_a/N_{RF}-1} e^{j2\pi d/\lambda i(\cos\theta-\cos\theta_0)} = \text{Gain\_Max} \quad (3)$$

In Equation (3), a maximal BF gain is obtained via analog BF in the same direction $\theta$ in each antenna subset and digital BF allocating different antenna subset phases.

Here, Gain_Max is not achieved simultaneously in all directions. Rather, it just maximizes gain in specific direction.

The above analysis can be extended to planar array case (for example, array of linear array).

Figure 2:
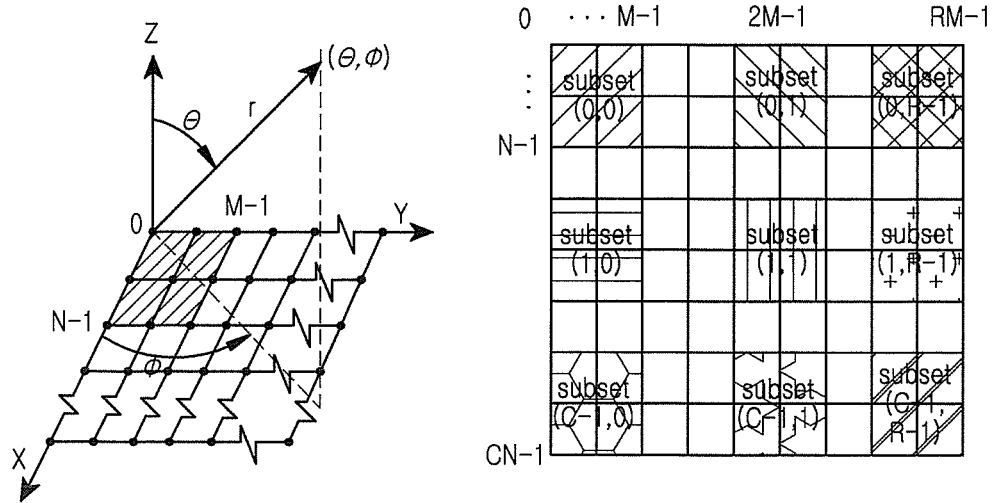
FIG. 2 illustrates a planner array according to an embodiment of the present disclosure.

FIG. 2 illustrates a planner array according to an embodiment of the present disclosure.

Referring to FIG. 2, the planner array of FIG. 2 consists of c*n linear array each having r*m antenna elements.

The planner array is partitioned into c*r subarrays each of which consists of M*N elements and is connected to one RF chain.

Within each subarray, analog BF is performed with main direction $(\theta_0, \phi_0)$. In addition, DBF is performed over R*C RF chains, with phase $\beta_{r,c}$ on the (r,c)th RF chain.

Similarly, the combined BF gain of 1-stream data is derived using Equation (4) below.

$$\text{Gain} = G_{DBF}(\theta, \phi) \times G_{SABF}(\theta, \phi) \quad (4)$$

where

-continued $$G_{SABF}(\theta, \phi) = \left( \sum_{m=0}^{M-1} \sum_{n=0}^{N-1} e^{j2\pi d/\lambda (m\sin\theta\cos\phi+n\sin\theta\sin\phi-m\sin\theta_0-n\sin\phi_0)} \right)$$

$$G_{DBF}(\theta, \phi) =$$

$$\sum_{r=0}^{R-1} \sum_{c=0}^{C-1} e^{j\beta_{r,c}} e^{-j2\pi d/\lambda (rM\sin\theta\cos\phi+cN\sin\theta\sin\phi-rM\sin\theta_0\cos\phi_0-cN\sin\theta_0\sin\phi_0)}$$

To maximize a BF gain in Equation (4), an optimal $\beta^*_{r,c}$ is derived to be $$\beta^*_{r,c} = 2\pi d/\lambda (rM \sin \theta \cos \phi + cN \sin \theta \sin \phi - rM \sin \theta_0 \cos \theta_0 - cN \sin \theta_0 \sin \phi_0) \quad (5)$$

Now, in an analog/digital mixed BF structure, a Reference Signal (RS) is described below.

Typically, a Reference Signal (RS) like midamble used for beam training and/or channel estimation in a millimeter radio wave communication system is transmitted via analog BF beams.

An MS selects a best beam (or an index for the best beam) and feeds back the same. The best beam (or the index for the best beam) is used for transmission of DL data or a dedicated control message.

For example, with 60 degree cell coverage and 10 degree half power beam width (HPBW), we need 6 RS beams to cover the entire cell, resulting in 10 degree-based beam selection.

When high accuracy is required for an MS direction, a BS needs to transmit more frequently RS beams with narrow spacing like 2 degrees, thus leading to much higher DL overhead (30 times greater RS beams are needed compared to this case). This unsolvable problem inherent with analog BF can be solved by using analog/digital BF.

Suppose B DL RSs cover the cell, with the main direction of analog BF of ith RS being $\theta_i$. Assume the number of digital BF entries is 2M+1 per each RS with angular spacing $\Delta$, and the jth entry corresponds to the direction $\theta_i + (j-M) \times \Delta$.

The digital BF phase on the lth RF chain of the ith RS of the jth entry is then $$\beta_{i,j,l} = 2\pi \times d \times l \times N_a/N_f/\lambda \times (\cos(\theta_i + (j-M) \times \Delta) - \cos \theta_i) \quad (6)$$

Therefore, the (i,j)th DBF entry is $$W_{i,j} = \left[ e^{j\theta_{i,j,0}}, \ldots, e^{j\theta_{i,j,N_{RF}-1}} \right].$$

In case of allocating the 2M+1 DBF entries to consecutive 2M+1 subcarriers, assume that channel response on the 2M+1 consecutive subcarriers is the same (highly correlated). In this case, the difference in received signal strength at different subcarriers is due to different digital BF.

An MS covered by the ith RS beam measures RS power on each subcarrier, and determines the subcarrier with highest signal power.

Based on the mapping of subcarrier to digital BF entry, a BS can recognize the best DL direction of the MS with respect to a DL direction.

Note that similar method can be applied to a planar array case where digital BF entries are determined based on 2-dimensional $(\theta, \phi)$ partition.

Targeting a uniform BF gain in the RS coverage, we can allocate unequal power to RS subcarriers such that equal power is transmitted in different directions consequently.

Suppose power P is allocated on the Mth entry, power boost factor $p_{boost}(i,j)$ is $$p_{boost}(i, j) = \frac{N_a}{N_{RF} \sum_{i=0}^{N_a/N_{RF}-1} e^{j2\pi d/\lambda i(\cos(\theta_i + (j-M)\times\Delta) - \cos\theta_i)}} \qquad (7)$$

A BS informs an MS if there is power boost on RS subcarriers, and the MS compensates for this boost value when comparing RS power with respect to different subcarriers.

The spectrum of a millimeter radio wave communication system is large, and multiple frequency partitions can be used during RS training. In the present disclosure, each beam has 2M+1 entries.

The MS sums up received power on each subcarrier and determines the one with highest average power or an index of the beam as the best DL direction.

Digital BF subcarriers can be subcarriers used for beam training. Also, note that both direction and CQI can be obtained via same RS signal. Also, the BS can reduce the load of RSs by transmitting the beams only toward directions reported by MSs.

Figure 3:
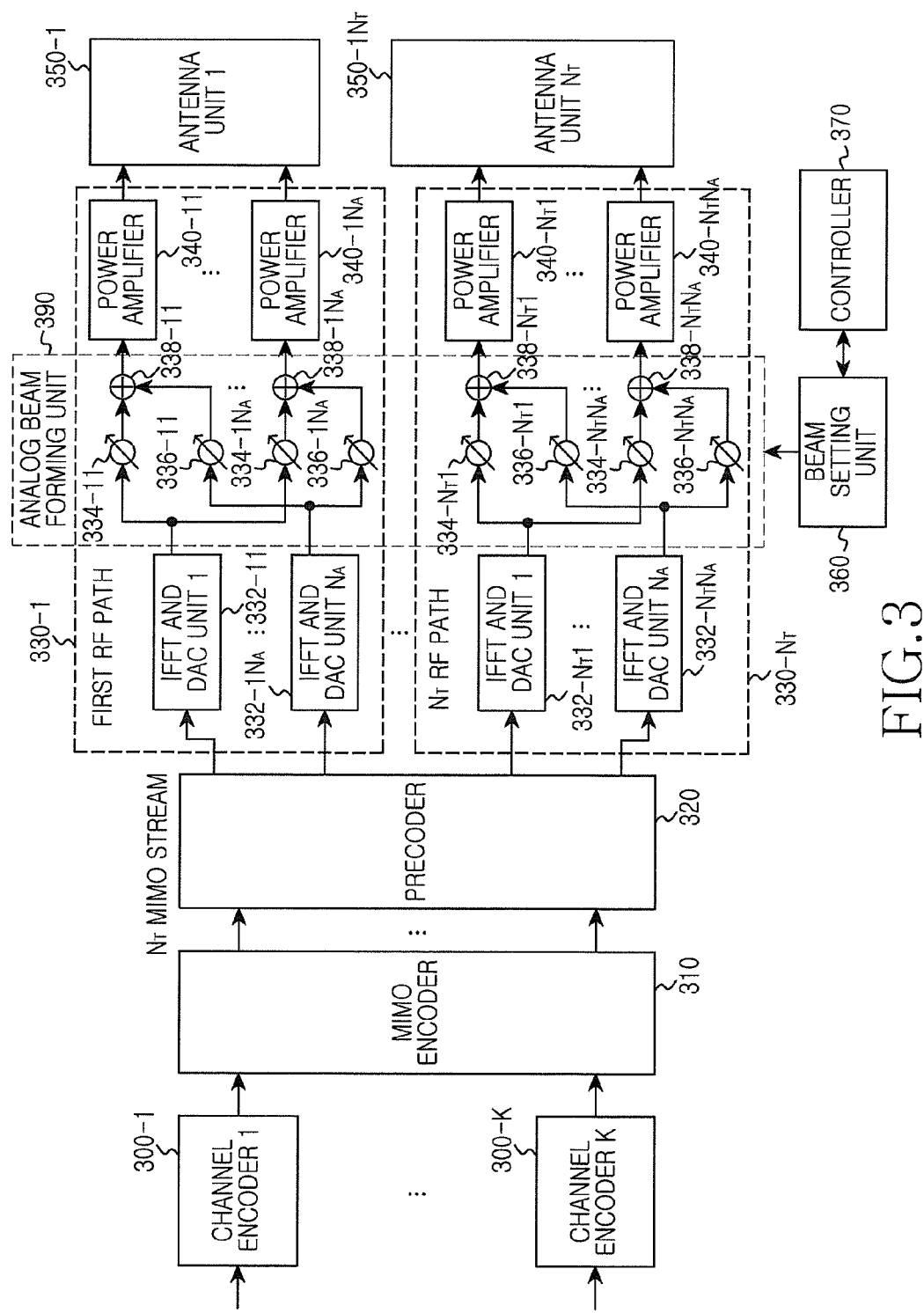
FIG. 3 illustrates a block diagram of a reception end according to an embodiment of the present disclosure.

FIG. 3 illustrates a block diagram of a reception end according to an embodiment of the present disclosure. Here, assume that the transmission end uses digital/analog mixed BF and represents a transmission end of an MS and a BS. FIG. 3 illustrates the transmission end of FIG. 1 in another embodiment of the present disclosure.

Referring to FIG. 3, the transmission end includes K channel encoders 300-1 to 300-K, an MIMO encoder 310, a precoder 320, $N_T$ RF paths 330-1 to 330-$N_T$, $N_T$ antenna units 350-1 to 350-$N_T$, a beam setting unit 360, and a controller 370.

Each of K channel encoders 300-1 to 300-K includes a channel encoder and a modulator to encode and modulate a signal to transmit to a reception end.

The MIMO encoder 310 multiplexes modulation signals provided from the K channel encoders 300-1 to 300-K as signals to transmit via $N_T$ streams in order to transmit signals via $N_T$ antenna units 350-1 to 350-$N_T$.

The precoder 320 precodes $N_T$ signals provided from the MIMO encoder 310 as precodes for digital BF and provides the same to respective RF paths 330-1 to 330-$N_T$.

Each of the $N_T$ RF paths 330-1 to 330-$N_T$ processes a signal provided from the precoder 320 in order to output the signal via a relevant antenna unit 350-1 to 350-$N_T$. At this point, the $N_T$ RF paths 330-1 to 330-$N_T$ are configured in the same way. Therefore, the configuration of a first RF path 330-1 is described as a representative in the following. At this point, the rest of the RF paths 330-2 to 330-$N_T$ are configured in the same way as the first RF path 330-1.

The first RF path 330-1 includes $N_A$ IFFT and DAC units 332-11 to 332-1$N_A$, an analog beam forming unit 390, and $N_A$ power amplifiers 340-11 to 340-1$N_A$. Here, $N_A$ is the number of antenna elements forming the antenna unit 1 350-1.

Each of $N_A$ IFFT and DAC units 332-11 to 332-1$N_A$ modulates and outputs a signal provided from the precoder 320 depending on a communication scheme. For example, each of $N_A$ IFFT and DAC units 332-11 to 332-1$N_A$ includes an Inverse Fast Fourier Transform (IFFT) operator and a Digital to Analog Converter (DAC). The IFFT operator converts a signal provided from the precoder 320 to a signal in a time domain via an IFFT operation. The DAC converts the signal in the time domain provided from the IFFT operator to an analog signal. That is, each of $N_A$ IFFT and DAC units 332-11 to 332-1$N_A$ allocates a resource for an MS with respect to a frequency domain under control of the controller 370.

The analog beam forming unit 390 changes the transmission beam direction of $N_A$ transmission signals provided from $N_A$ IFFT and DAC units 332-11 to 332-1$N_A$ and outputs the same according to a control signal representing a transmission beam direction provided from the beam setting unit 360.

For example, the analog beam forming unit 390 includes a plurality of phase shift units 334-11 to 334-1$N_A$, 336-11 to 336-1$N_A$, and couplers 338-11 to 338-1$N_A$. Each of the $N_A$ IFFT and DAC units 332-11 to 332-1$N_A$ divides an output signal into $N_A$ signals and outputs the same to respective phase shift units 334-11 to 334-1$N_A$, 336-11 to 336-1$N_A$. Each of the phase shift units 334-11 to 334-1$N_A$, 336-11 to 336-1$N_A$ shifts the phase of a signal provided from the $N_A$ IFFT and DAC units 332-11 to 332-1$N_A$ according to a control signal representing a transmission beam direction provided from the beam setting, unit 330. The couplers 338-11 to 338-1$N_A$ couple output signals of the phase shift units 334-11 to 334-1$N_A$, 336-11 to 336-1$N_A$ corresponding, to an antenna factor and output the same.

The power amplifiers 340-11 to 340-1$N_A$ amplify the power of signals provided from the couplers 338-11 to 338-1$N_A$, and output the same to the outside via the antenna unit 1 350-1.

The beam setting unit 360 selects a transmission beam direction to use in transmitting a signal and provides a control signal depending on the selected transmission beam direction to the analog beam forming unit 390 under control of the controller 370.

For example, the beam setting unit 360 provides a control signal corresponding to a transmission beam direction for transmission of an RS or a preamble/midamble or data to the analog beam forming unit 390 under control of the controller 370. For another example, the beam setting unit 360 selects the transmission beam direction that can obtain an optimal transmission efficiency with a reception end with consideration of channel information depending on each transmission beam direction provided from an MS under control of the controller 370.

The controller 370 controls the beam setting unit 360 to select the transmission beam direction. For example, the controller 370 controls the beam setting unit 360 to transmit an RS or data via each transmission beam direction supportable by the transmission end. For another example, the controller 370 controls the beam setting unit 360 to select an optimal transmission beam direction with consideration of channel information for a transmission beam direction provided from the reception end.

The transmission end may be provided with an optimal transmission beam direction selected by the reception end from the reception end. In this case, the beam setting unit 360 provides a control signal and data depending on the optimal transmission beam direction selected by the reception end to the analog beam forming unit 390.

The controller 370 of the transmission end may transmit a control message to a counterpart node (for example, serving base station, neighbor BS, or MS).

In the present disclosure, the controller 370 controls the beam forming unit 390 to transmit an RS using Equation (6). When a power boost is applied, the controller 370 determines a power boost factor using Equation (7) and informs an MS of this.

Figure 4:
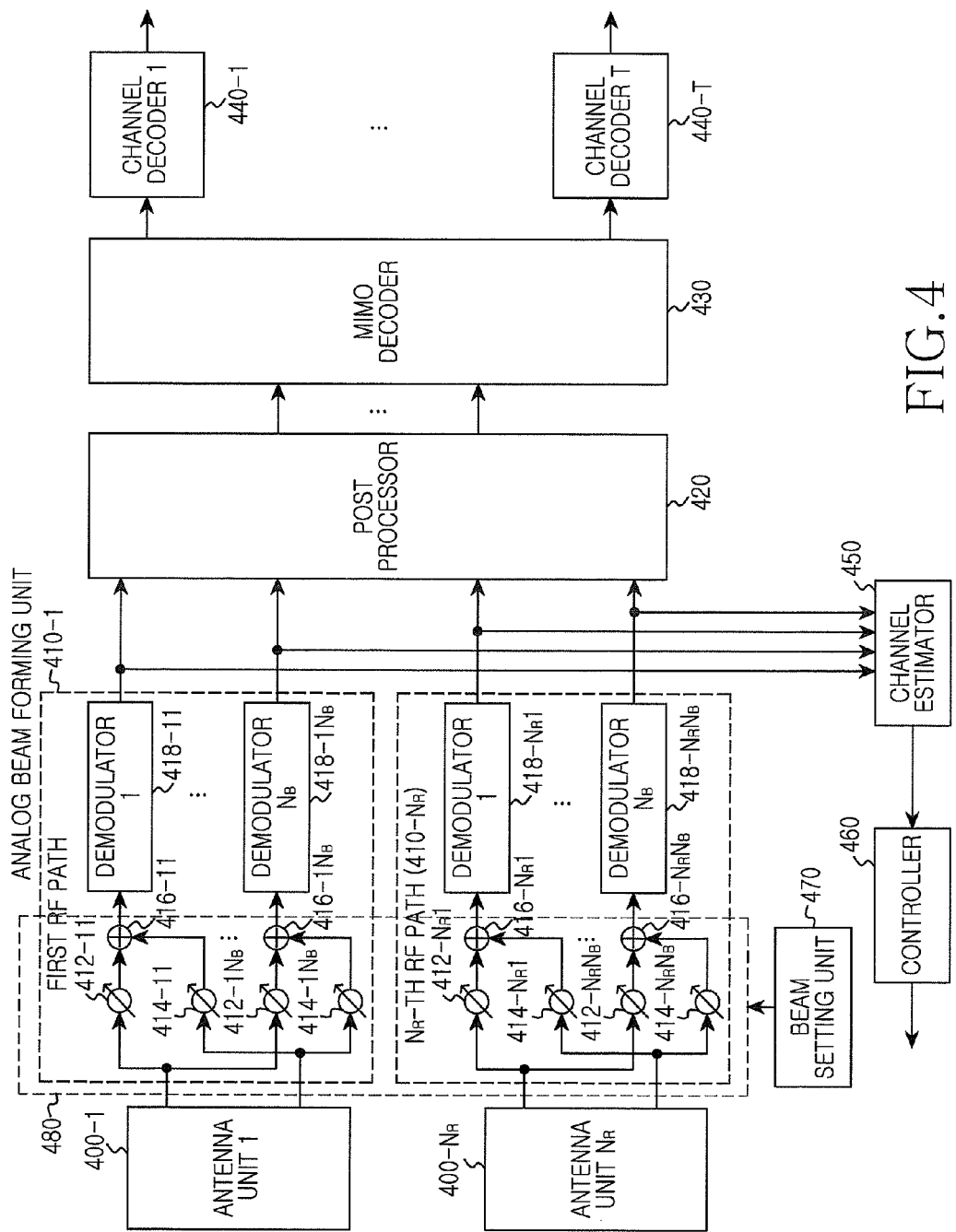
FIG. 4 illustrates a block diagram of a reception end according to an embodiment of the present disclosure.

FIG. 4 illustrates a block diagram of a reception end according to an embodiment of the present disclosure. Here, assume that the reception end uses a method that can receive a beam by digital/analog mixed BF, and may represent the reception end of an MS and a BS.

Referring to FIG. 4, the reception end includes $N_R$ antenna units 400-1 to 400-$N_R$, $N_R$ RF paths 410-1 to 410-$N_R$, a post processor 420, an MIMO decoder 430, T channel decoders 440-1 to 440-T, a channel estimator 450, a controller 460, and a beam setting unit 470.

Each of $N_R$ RF paths 410-1 to 410-$N_R$ processes a signal received via a relevant antenna unit 400-1 to 400-$N_R$. At this point, the $N_R$ RF paths 410-1 to 410-$N_R$ are configured in the same way. Therefore, the configuration of the first RF path 410-1 is described as a representative in the following. At this point, the rest of the RF paths 410-2 to 410-$N_R$ are configured in the same way as the first RF path 410-1.

The first RF path 410-1 includes an analog beam forming unit 480 and $N_B$ IFFT and DAC units 418-11 to 418-1$N_B$. Here, $N_B$ is the number of antenna elements forming the antenna unit 1 400-1.

The analog beam forming unit 480 changes the direction of $N_B$ reception signals provided from antenna elements forming the antenna unit 1 400-1 depending on a transmission beam direction provided from the beam setting unit 470, and outputs the same. For example, the analog beam forming unit 480 includes a plurality of phase shift units 412-11 to 412-1$N_B$, 414-11 to 414-1$N_B$, and couplers 416-11 to 416-1$N_B$.

Antenna elements forming the antenna unit 1 400-1 divides a reception signal into $N_B$ signals and outputs the same to respective phase shift units 412-11 to 412-1$N_B$, 414-11 to 414-1$N_B$. Each of the phase shift units 412-11 to 412-1$N_B$, 414-11 to 414-1$N_B$ shifts the phase of a signal provided from the antenna elements forming the antenna unit 1 400-1 depending on a reception beam direction provided from the beam setting unit 470.

The couplers 416-11 to 416-1$N_B$ couple output signals of phase shift units 414-11 to 414-1$N_B$, 414-11 to 414-1$N_B$ and output the same.

Each of the $N_B$ demodulators 418-11 to 418-1$N_B$ demodulates a reception signal provided from the couplers 416-11 to 416-1$N_B$ according to a communication scheme, and outputs the same. For example, each of the $N_B$ demodulators 418-11 to 418-1$N_B$ includes an Analog to Digital Converter (ADC) and a Fast Fourier Transform (FFT) operator. The ADC converts a reception signal provided from the couplers 416-11 to 416-1$N_B$ to a digital signal. The FFT operator converts a signal provided from the ADC to a signal in the frequency domain via an FFT operation.

The post processor 420 post-decodes a signal provided from the $N_R$ RF paths 410-1 to 410-$N_R$ according to a precoding scheme of the transmission end and provides the same to the MIMO decoder 430.

The MIMO decoder 430 multiplexes $N_R$ reception signals provided from the post processor 420 as T signals and outputs the same such that the T channel decoders 440-1 to 440-T may decode the T signals.

Each of the T channel decoders 440-1 to 440-T includes a demodulator and a channel decoder to demodulate and decode a signal provided from the transmission end.

The channel estimator 450 estimates channel information via an RS transmitted by the transmission end via each transmission beam direction. At this point, when a scan event occurs, the channel estimator 450 estimates the channel information for each transmission beam direction. Here, the channel information includes at least one of a Signal to Noise Ratio (SNR), a Carrier power Interference and Noise power Ratio (CINR), and a Received Signal Strength Indicator (RSSI).

The controller 460 transmits the channel information for each transmission beam direction estimated by the channel estimator 450 to the transmission end. For example, the controller 460 transmits channel information for transmission beam directions whose channel state is good to the transmission end.

For another example, in the case where the reception end supports reception BF, the controller 460 may transmit channel information for transmission beam directions whose channel state is equal to or greater than a reference value to the transmission end for each reception beam direction.

Also, the controller 460 may select a transmission beam direction that can obtain an optimal transmission efficiency with the transmission end with consideration of channel information depending on each transmission beam direction estimated by the channel estimator 450.

For example, the controller 460 selects a transmission beam direction that can obtain an optimal transmission efficiency with the transmission end with consideration of channel information depending on each transmission beam direction estimated by the channel estimator 450. In the present disclosure, the controller 460 calculates average power every subcarrier transmitted by the BS, and selects a best subcarrier having largest average power.

In FIGS. 3 and 4, the function of the beam setting unit may be performed by the controller 370 or 460.

Figure 5:
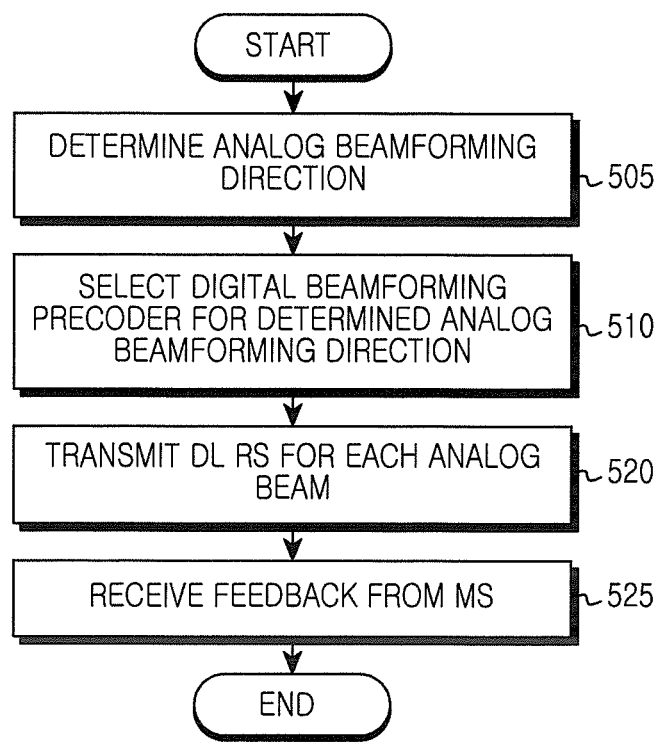
FIG. 5 illustrates a flowchart of an operation procedure of a base station (BS) according to an embodiment of the present disclosure.

FIG. 5 illustrates a flowchart of an operation procedure of a base station (BS) according to various embodiments of the present disclosure.

Referring to FIG. 5, the BS determines an analog BF direction (step 505), which denotes that the BS can determine directions in advance on which analog BF is to be performed. This denotes that the BS determines a section of degrees by which a relevant direction is divided. The BS can inform an MS of the analog BF direction or the MS may possess in advance the analog BF direction determined by the BS.

After that, the BS selects a digital BF precoder with respect to each analog BF direction (step 510). This denotes that the BS determines 2M+1 digital BF directions with respect to each analog BF direction.

After that, the BS transmits a DL RS for each analog beam (step 520).

Here, the BS repeatedly allocates 1 to 2M+1 digital BF precoders N times for consecutive frequency resources (for example, subcarriers) in the frequency domain. Frequency allocation information for subcarriers like 2M−1, N, 2M+1 is determined in advance or broadcast. Also, the BS informs the MS whether a power boost has been applied to an RS. When applied, the MS calculates the signal power of each subcarrier based on the power of a received signal using the power boost factor.

After that, the BS receives feedback from the MS (step 525).

The method described above in relation with FIG. 5 under of the present invention may be provided as one or more instructions in one or more software modules, or computer programs stored in an electronic device including a base station.

Figure 6:
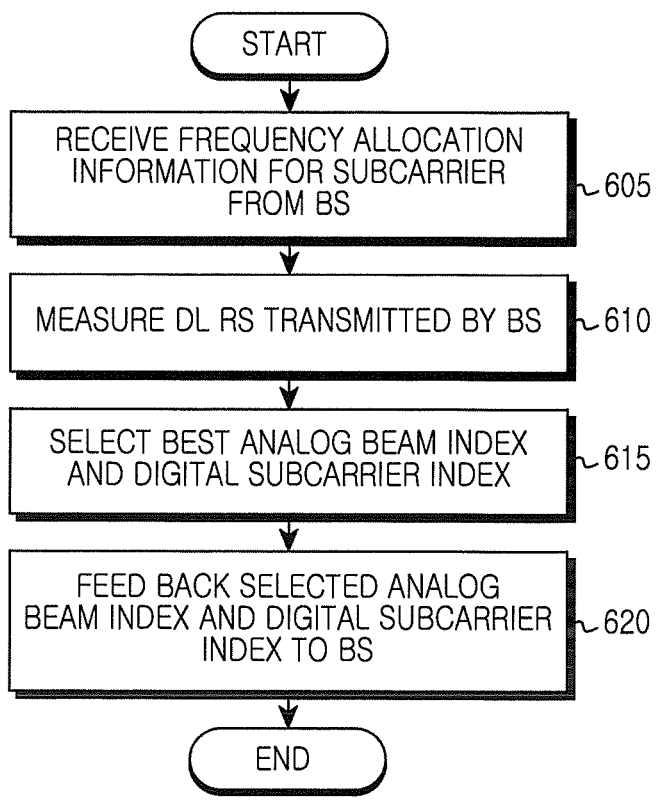
FIG. 6 illustrates a flowchart of an operation procedure of an mobile station (MS) according to an embodiment of the present disclosure.

FIG. 6 illustrates a flowchart of an operation procedure of an MS according to various embodiments of the present disclosure.

Referring to FIG. 6, the MS receives frequency allocation information for subcarriers from a BS (step 605). The reception process is selective and the MS may possess the frequency allocation information in advance.

After that, the MS measures a DL RS transmitted by the BS (step 610).

After that, the MS selects a best analog beam index and a best digital subcarrier index (beam index) (step 615). Here, the MS selects a best precoder (for example, best subcarrier index). Also, the MS calculates average power every subcarrier in the frequency domain thereof and selects a best subcarrier having largest average power.

After that, the MS feeds back the selected analog beam index and digital subcarrier index (beam index) to the BS (step 620).

The method described above in relation with FIG. 6 under of the present invention may be provided as one or more instructions in one or more software modules, or computer programs stored in an electronic device including a mobile station.

Figure 7:
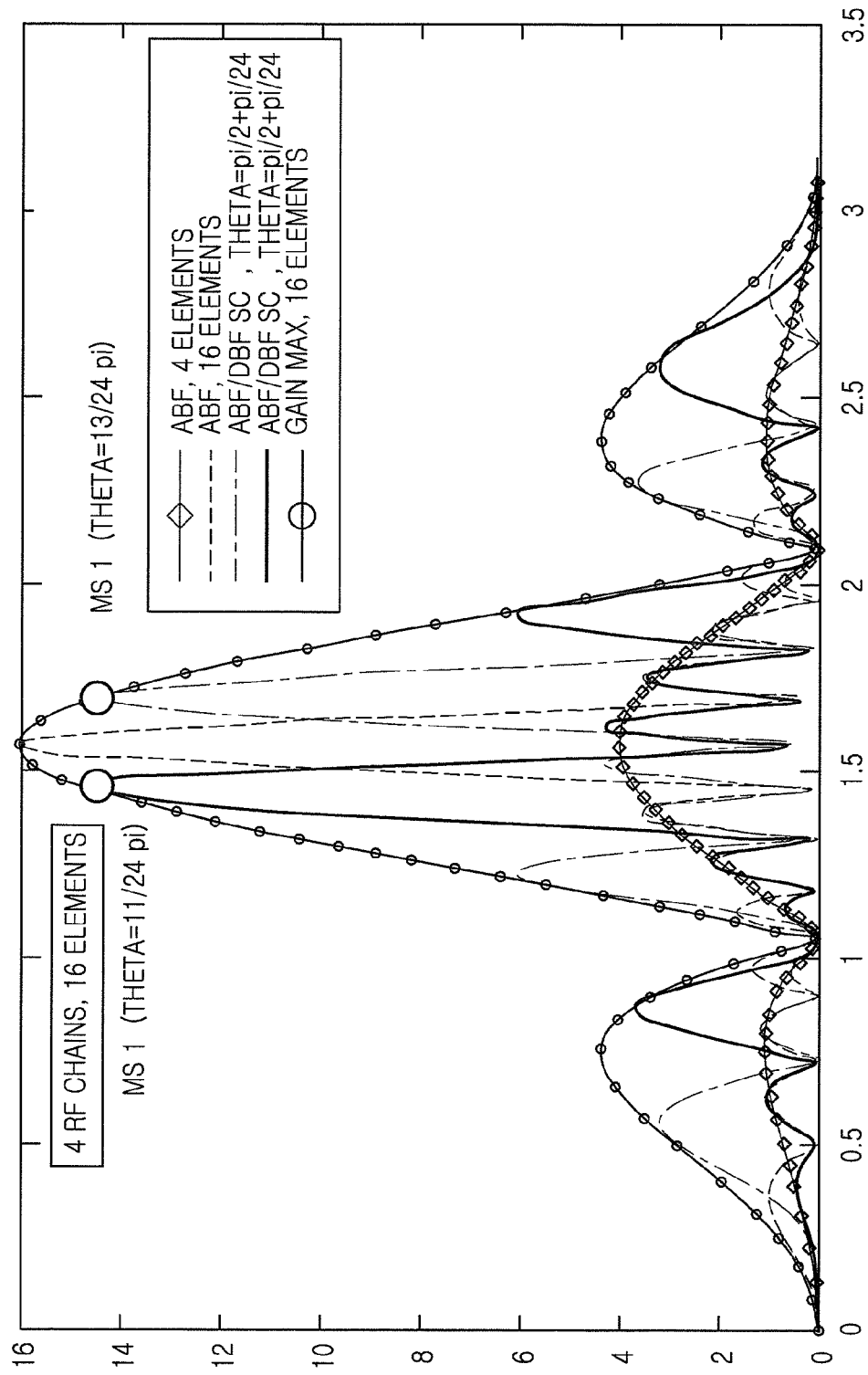
FIG. 7 illustrates a BF direction according to an embodiment of the present disclosure.

FIG. 7 illustrates a BF direction according to an embodiment of the present disclosure.

Referring to FIG. 7, assuming that an MS 1 and an MS 2 have transmitted a codebook index for a best BF direction, the BS can recognize that θ of the MS 1 and the MS 2 are 11/24 pi and 13/24 pi, respectively, and the BS can recognize the positions of the MS 1 and the MS 2.

Embodiments of the present invention according, to the claims and description in the specification can be realized in the form of hardware, software or a combination of hardware and software. Such software may be stored in a computer readable storage medium. The computer readable storage medium stores one or more programs (software modules), the one or more programs comprising instructions, which when executed by one or more processors in an electronic device, cause the electronic device to perform methods of the present invention. Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

The present disclosure has an advantage of maximizing a mixed analog/digital BF gain even in any predetermined direction with respect to a main analog/digital beam peripheral direction in an analog/digital mixed BF system.

Although the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

What is claimed is:

1. A method for operating a base station (BS) in an analog/digital mixed BF system, the method comprising:
   determining an analog beamforming (BF) direction;
   determining a digital BF precoder for the determined analog BF direction;
   performing digital BF precoding using the digital BF precoder with respect to the determined analog BF direction; and
   transmitting a downlink reference signal (DL RS) in the analog BF direction on which the digital BF precoding has been performed.

2. The method of claim 1, further comprising:
   receiving feedback from a mobile station (MS).

3. The method of claim 2, wherein the feedback comprises at least one of best analog BF direction information or best digital BF subcarrier index determined by the MS.

4. The method of claim 1, wherein determining the digital BF precoder for the determined analog BF direction comprises:
   allocating a digital BF precoder on consecutive frequency resources in a frequency domain.

5. The method of claim 1, further comprising:
   if a power boost is applied to the DL RS, transmitting an indication to the MS that the power boost is applied.

6. A method for operating a mobile station (MS) in an analog/digital mixed beamforming (BF) system, the method comprising:
   receiving a downlink reference signal (DL RS) transmitted by a base station (BS);
   determining a precoder from the DL RS; and
   transmitting information regarding the determined precoder to the BS, wherein the information regarding the determined precoder comprises information on a subcarrier that is determined based on powers associated with each of a plurality of subcarriers.

7. The method of claim 6, further comprising:
   receiving frequency allocation information from the BS.

8. The method of claim 6, wherein the information regarding the selected precoder comprises information on a best subcarrier.

9. The method of claim 6, wherein selecting the precoder from the DL RS comprises:
   calculating average power for a plurality of subcarriers; and
   determining the subcarrier comprisinng a largest average power.

10. The method of claim 6, wherein the information regarding the determined precoder comprises information of a best analog BF direction and information of a best digital BF subcarrier index determined by the MS.

11. A base station (BS) in an analog/digital mixed beamforming (BF) system, the BS comprising:
   a controller configured to determine an analog BF direction, determine a digital BF precoder for the determined analog BF direction, perform digital BF precoding using the digital BF precoder on the determined analog BF direction, and generate a downlink reference signal (DL RS) directed to the analog BF direction on which the digital BF precoding has been performed;
   a transceiver configured to transmit the DL RS;
   a plurality of antennas comprising a plurality of antenna elements; and
   a plurality of radio frequency (RF) chains connected to the antenna elements, the RF chains configured to form a beam to the analog beam direction determined by the controller.

12. The BS of claim 11, wherein the transceiver is configured to receive feedback from a mobile station (MS).

13. The BS of claim 12, wherein the feedback comprises at least one of best analog BF direction information and best digital BF subcarrier index determined by the MS.

14. The BS of claim 11, wherein in determining the digital BF precoder for the determined analog BF direction, the controller is configured to allocate a digital BF precoder on consecutive frequency resources in a frequency domain.

15. The BS of claim 11, wherein if a power boost is applied to the DL RS, the transceiver is configured to transmit an indication to the MS that the power boost is applied.

16. A mobile station (MS) in an analog/digital mixed beamforming (BF) system, the MS comprising:
- A transceiver configured to receive a downlink reference signal (DL RS) from a base station (BS) and transmit information regarding a precoder to the BS;
- a channel estimator configured to estimate a channel based on a DL beam direction using the DL RS; and
- a controller configured to determine the precoder from the DL RS with consideration of channel information based on the DL beam direction,
- wherein the information regarding the precoder comprises information on a subcarrier that is determined based on powers associated with each of a plurality of subcarriers.

17. The MS of claim 16, wherein the receiver is configured to receive frequency allocation information from the BS.

18. The MS of claim 16, wherein the information regarding the precoder comprises information on a best subcarrier.

19. The MS of claim 16, wherein in determining the precoder from the DL RS, the controller is configured to calculate average power for the plurality of subcarriers, and determine the subcarrier comprising a largest average power.

20. The MS of claim 16, wherein the information regarding the precoder comprises information of a best analog BF direction and information of a best digital BF subcarrier index determined by the MS.

* * * * *